May 15, 1962
G. A. LYON
3,034,144
SINK STRUCTURE
Filed July 27, 1959
2 Sheets-Sheet 1
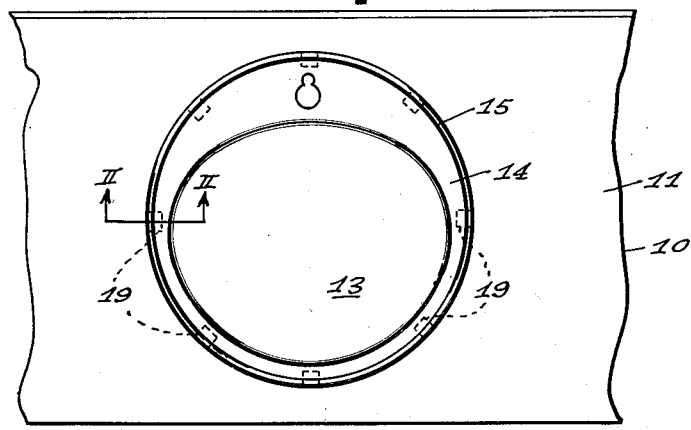
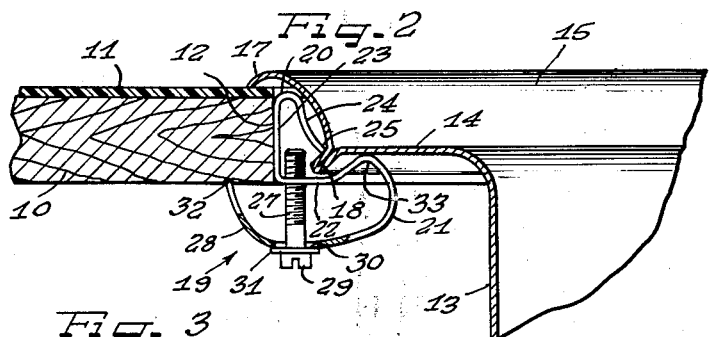
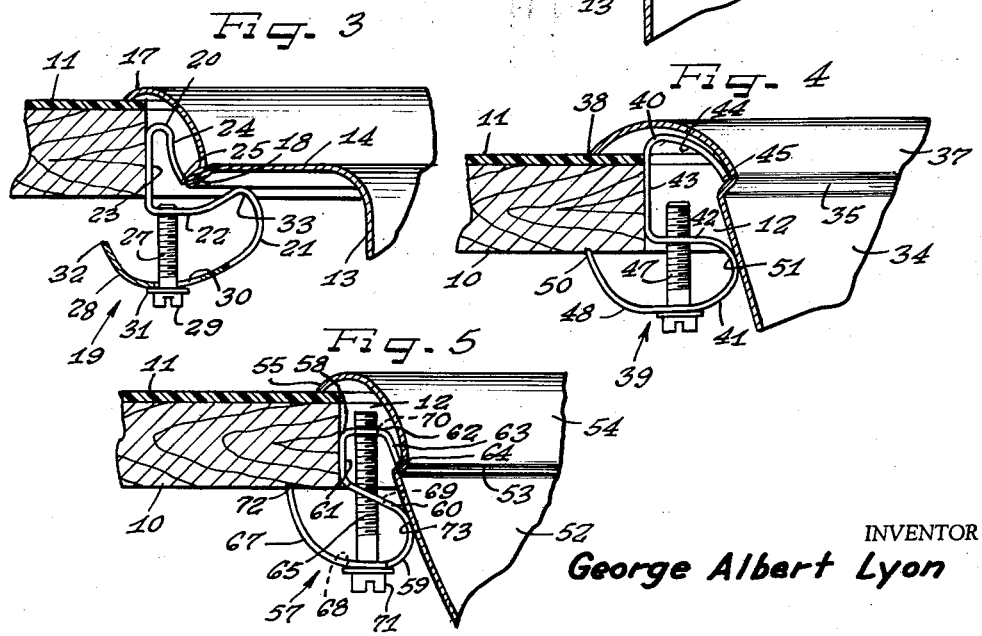
INVENTOR
George Albert Lyon
BY
ATTORNEY May 15, 1962  G. A. LYON  3,034,144
SINK STRUCTURE
Filed July 27, 1959  2 Sheets-Sheet 2
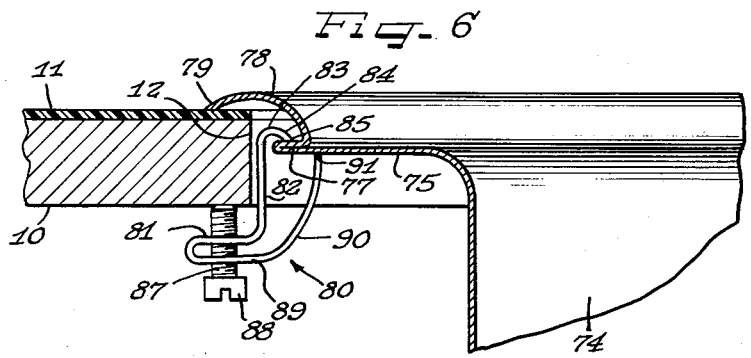
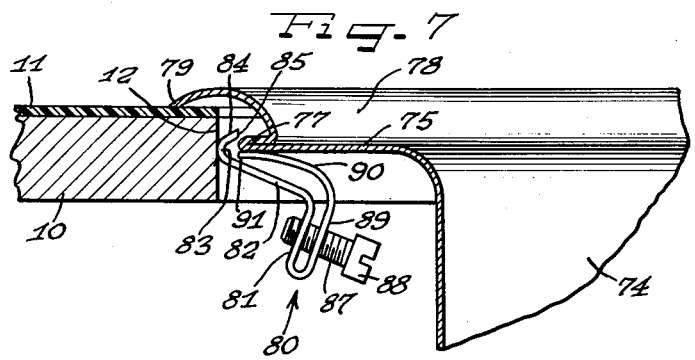
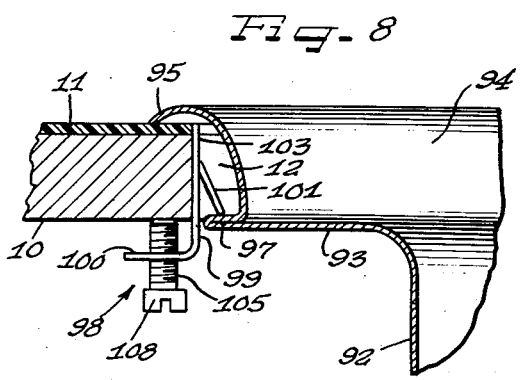
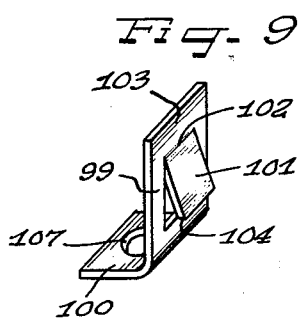
INVENTOR
*George Albert Lyon*
BY
*ATTORNEY*

United States Patent Office 3,034,144
Patented May 15, 1962

3,034,144
SINK STRUCTURE
George Albert Lyon, Detroit, Mich., assignor to Lyon Incorporated, Detroit, Mich., a corporation of Delaware
Filed July 27, 1959, Ser. No. 829,775
5 Claims. (Cl. 4—187)

The present invention relates to sink structure and more particularly concerns improved means for retaining a sink in position with respect to a counter top.

An important object of the present invention is to provide an improved sink structure wherein resilient spring retaining clips are utilized for retaining and centering a sink with respect to a counter top.

Another object of the invention is to provide improved sink retaining means adapted to be placed under clamping, gripping tension by movable cramping means.

A further object of the invention is to provide improved retaining spring clip means for retaining sinks in position with respect to counter tops.

Still another object of the invention is to provide improved spring retaining means for sinks adapted to be snapped into position and including means for tightening the clips into sink and counter top clamping relation.

Other objects, features and advantages of the present invention will be readily apparent from the following detailed description of certain preferred embodiments thereof taken in conjunction with the accompanying drawing, in which:

FIGURE 1 is a top plan view of a sink structure embodying features of the invention;

FIGURE 2 is an enlarged fragmentary sectional detail view taken substantially on the line II—II of FIGURE 1;

FIGURE 3 is a sectional view similar to FIGURE 2 but showing the retaining spring clip in a preliminary position during assembly;

FIGURE 4 is a similar view but showing a modification;

FIGURE 5 is another similar view but showing another modification;

FIGURE 6 is another similar view showing still another modification;

FIGURE 7 is a view similar to FIGURE 6 and showing the same structure but illustrating a manner in which the retaining clip is adapted to be assembled with the sink and counter top;

FIGURE 8 is a fragmentary vertical sectional detail view similar to FIGURE 6 but showing a further modification; and FIGURE 9 is an isometric view of the retaining clip of FIGURE 8.

Referring to FIGURES 1 and 2, a counter top 10 which may be of wood construction has a surface lamina 11 thereon of any suitable nature such as a thermosetting plastic, and an opening 12 is provided in the counter top within which a sink 13 is received. In this instance the sink is shown as of a more or less oval bowl and round rim form but it is to be understood that it may be square or rectangular or other desirable outline.

As shown, the sink 13 is of the drawn or spun sheet metal type made from stainless steel or other material such as cold rolled steel with a protective enamel coating thereon. On its upper end the sink 13 has a lateral rim flange 14 which includes an arched portion 15 providing a drainback and having an outer downturned margin 17 engageable upon the upper surface of the counter top 10. In effect, the portion 15 provides a rib-like fairly stiff seating rim frame for the sink which provides with the edge of the counter top defining the opening 12 a substantial downwardly opening chamber including at the inner side where the frame marginal extension seating portion 15 joins the horizontally extending portion of the flange 14 a reinforcing juncture fold flange 18 extending generally outwardly and in this instance downwardly and providing a generally upwardly facing shoulder defining with the overlying body of the rim portion 15 an outwardly opening groove.

For retaining the sink 13 against upward displacement relative to the counter top 10, a series of suitable number of resilient spring sink retaining clips 19 is provided. Each of the clips 19 is of generally S-shape in side elevation and is made from suitable spring metal stock such as spring steel strip of a desirable width and gauge. Between an upper open hook-like open loop portion 20 and a lower hook-like open loop portion 21 the clip has an intermediate body portion 22 which in this instance extends generally horizontally in assembly with the sink 13 and the counter top 10 and has on its outer end an upstanding, advantageously substantially straight flange arm portion 23 providing the outermost portion of the upper loop 20 and adapted to engage in face-to-face abutment with the adjacent portion of the edge defining the counter top opening 12. From the upper end of the upstanding arm 23 the loop 20 extends on a small radius inward and downward bend juncture to provide a generally downwardly and inwardly projecting resiliently flexible terminal flange leg 24 having a tip 25 engageable retainingly with the shoulder flange 18 of the sink rim flange structure. Through this arrangement, a generally U-shaped retaining hook head is provided for the retaining clip 19 with the tip 25 normally projecting by virtue of the divergence of the terminal flange 24 from the arm 23 to thrust downwardly against the sink rim shoulder flange 18 adjacent juncture thereof with the body of the frame rim portion 15.

Downward sink rim retaining, clamping thrust of the clip terminal tip 25 against the shoulder 18 is effected by downward pull imposed on the upper retaining head loop 20 of the clip through the medium of movable actuating means conveniently comprising a screw 27 coacting with a counter top engageable resiliently flexible and tensionable cramping and clamping lever arm 28 of the lower clip loop 21. In a desirable form, the screw 27 is threadedly engaged upwardly through a suitable threaded aperture in the clip body 22. On its lower end the screw 27 has tool engageable and thrust shoulder means in the form of a head 29 thrustingly opposing the underside of the clip arm 28 while the shank of the screw adjacent to the head extends through a clearance aperture 30 in the arm elongated longitudinally of the arm to enable a range of free movement of the arm longitudinally thereof relative to the screw. Either the head of the screw may be of large enough diameter to afford substantial thrust bearing against the opposed surface of the arm or an enlarged thrust washer 31 may be employed between the head of the screw and the arm.

Assembly of the structure may be effected in an inverted relation of the counter top 10 and the sink 13 or in an upright relationship thereof. In either event, the sink and counter top are assembled with the sink extending through the counter top opening 12 and the sink rim margin 17 engaging the upper surface margin of the counter top adjacent to the opening 12. Then, the series of retaining clips 19 is assembled with the sink and counter top. Normally, the retaining terminal leg flange 24 of the clip in each instance diverges from the clip arm 23 at least as far as will position the clip leg terminal 25 from the arm 23 a distance which will assure ample spread for engagement of the rim shoulder flange 18 as close as practicable to juncture thereof with the frame portion 15 with the clip arm 23 engaging the sink rim edge in the assembly. In order to effect assembly of the clip head loop 20 through the narrow gap between the outer edge of the fold shoulder flange 18 and the adjacent edge of the counter top the clip head loop 20 is resiliently compressible as illustrated in FIG. 3. Thus, the upper turned juncture portion of the loop 20 between the arm 23 and the terminal leg 24 is small enough to clear through the gap as the clip 19 is pushed head first into the gap with the arm 23 engaging the edge of the counter top and the terminal leg 24 bearing against the tip of the flange 18. As the assembly push on the clip continues, the rim shoulder flange tip cammingly resiliently deflects the terminal leg 24 toward the arm 23 while the arm 23 slides axially along the edge of the counter top 10 into the chamber defined between the counter top edge and the rim flange extension frame portion 15. Compression of the loop 20 continues until the thrust terminal 25 clears the tip of the flange 18, whereupon resilient tension developed in the terminal flange leg 24 causes it to snap open and effect engagement of the terminal tip 25 upon the inner end of the flange 18. In such assembled relationship of the clip head loop 20 with the sink rim and counter top, adjustment of the clip peripherally of the sink can be effected easily for optimum location of the clip relative to the sink rim, but withdrawal of the clip is effectively resisted by virtue of abutment of the arm 23 shoulderingly against the adjacent edge of the counter top 10 and thrusting engagement of the leg tip 25 against the sink rim shoulder 18. In fact, since the edge of the retaining thrust tip 25 is fairly sharp, it has an anti-slip biting coaction with the flange 18 strongly resisting slippage toward the gap between the flange 18 and the counter top edge. Such anti-slippage effect is enhanced by curvature of the clip arm flange 24 as shown with the tip 25 directed inwardly relative to the arm whereby any tendency of the terminal flange 24 to flex yieldably in response to downward pull on the clip is biased outwardly toward the clip arm 23 while the retaining tip 25 will turn further inwardly and thus even more effectively retainingly against the shoulder flange 18.

Downwardly pulling thrust coaction of the clip head 20 with the sink rim is effected by drawing up the screw 27 from an initial backed off position substantially as shown in FIGURE 3 wherein the lower clip arm 28 is in an open normal position as shown. Then, after the clip 19 has been preliminarily assembled with the sink and counter top by snapping the retaining loop head 20 into position within the chamber between the rim flange and the counter top edge and the position of the clip determined, the screw 27 is drawn up and thereby flexibly resiliently deflects the resilient lower spring arm 28 toward the clip body 22. At its free end the arm 28 has an upwardly turned, fairly sharp terminal 32 disposed substantially outwardly relative to the upstanding clip arm 23 and engageable with clamping thrust against the underside of the counter top 10 by the flexible leverage action on the arm 28 by the screw 27. In the continued upward thrust of the clamping arm terminal 32 against the counter top as the screw 27 is tightened, the clip head loop 20 is drawn downwardly so that the clip terminal arm 24 draws the frame extension 15 of the sink rim downwardly and thereby clampingly thrusts the edge of the rim margin 17 firmly, sealingly against the counter top.

It will be observed that downward pull on the sink rim engaging clip head 20 is effected quite efficiently since the point at which the screw 27 imposes downward pull on the clip body 22 is close to the plane of the upstanding clip arm 23. Thus, there is minimum tendency for the clip body 22 to yield or spring away in response to the downward pull. Furthermore, the clip arm 23 is effectively held against tendency to spring outwardly due to thrust reaction forces imposed through the terminal arm 24, since the clip arm 23 shoulders against the edge of the counter top 10. Moreover, any tendency for the terminal flange 24 to spring open under the downward pull is beneficially reflected in an inward centering component of thrust on the sink rim as well as a downward clamping component of thrust. Thereby the several retaining clips about the perimeter of the sink coact to hold the sink not only against upward displacement but also centered in the counter top opening 10. Nevertheless, should there be some factor such as plumbing that necessitates a slightly eccentric disposition of the sink relative to the counter top opening, the inherent resilient flexibility of the retaining clips permits such necessary eccentricity to exist since the several clips can compensate therefor.

Any tendency for the clip 19 to cant inwardly in the lower portion thereof due to resilient flexing of the lower clip arm 28 during tightening of the screw 27 after the thrust terminal 32 thereof has bitingly engaged the underside of the counter top is compensated for by shouldering of the lower clip loop 21 against the sink. In this instance such shouldering is effected by a resilient upwardly bowed shoulder portion 33 provided on the juncture portion of the lower loop 21 with the clip body 22. As the lower clip arm 28 is compressed by action of the screw 27, a cramping action occurs which thrusts the shoulder 33 against the underside of the rim flange 14 adjacent to juncture of the shoulder flange 18 therewith. This effectively stabilizes the clamping arm 28 and assures thorough downward pull on the clip head 20 for most efficient retaining clamping centering coaction with the sink rim flange structure.

Should it be desired to remove any or all of the clips 19, this can be readily effected by backing off the screw 27 to thereby release the clamping and cramping arm 28 so that it will spring away from the counter top 10. Then a pry-off tool such as a screwdriver can be inserted into the gap between the counter top edge and the sink flange 18 and into the slight gap between the outwardly bowed clip terminal leg 24 and the adjacent portion of the sink rim flange frame 15. Leverage can then be applied to the flange leg 24 to flex it outwardly and clear the retaining terminal tip 25 from the rim flange shoulder 18, thus enabling withdrawal of the clip head 20 from the assembled relationship.

In the modification of FIGURE 4 the counter top is shown as substantially the same as in FIGURE 2, but a modified sink 34 is provided of a type having the wall of the sink bowl sloping inwardly and downwardly from an underturned splash guard juncture flange 35 projecting generally outwardly and in this instance sloping downwardly from the inner margin of a rim flange 37 of arched cross-section and having an outer downturned counter top engaging margin 38. It will be observed that the underturned, offsetting juncture flange 35 afford substantial reinforcement for the rim flange 37, enabling the sink to be made from fairly thin gauge material. In addition, the flange 35 provides on its upper side under the rim flange portion 37 a generally upwardly facing shoulder defining an outwardly opening groove with the rim flange portion 37.

In this instance, resilient spring clips 39 of generally S-shape in side elevation are provided which in general have similar elements and function substantially like the retaining clips 19. To this end, the clips 39, of which a representative example is illustrated, each comprises an upper hook-like loop 40, a lower hook-like loop 41 and a connecting body 42 extending generally horizontally in the assembly and having extending upwardly from the outer end thereof a counter top edge engaging abutment arm 43 from the upper end of which is turned a generally inwardly and downwardly extending resilient terminal leg flange 44 having a rim flange shoulder engaging tip 45. Normally the terminal leg 44 is disposed in a sprung open relationship to the arm 43 wherein the tip 45 is spaced a greater distance from the arm 43 than the spacing between the edge of the counter top defining the opening 12 and the innermost end of the shoulder flange 35 of the sink. Assembly of the clip 39 is therefore adapted to be effected the same as described in connection with the clip 19, having particular reference to FIGURE 3, namely, by moving the clip 39 up into the gap between the counter top edge and the outermost projection of the sink shoulder flange 35, with compressive flexing of the terminal leg 44 until the tip 45 snaps into engagement over the shoulder 35.

After such preliminary assembly of the clip 39, movable clip actuating and clamping means in the form of a screw 47 threadedly engaged through the clip body portion 42 is manipulated similarly as the screw 27 to draw up flexibly a resilient normally sprung open lower loop cramping and clamping arm 48 through which the shank of the screw extends through a suitable clearance opening in the arm, a lower end thrust shoulder head 49 of the screw bearing against the arm. Thereby, a biting generally upwardly directed terminal tip 50 of the arm 48 engages clampingly against the underside of the counter top 10 and under the combined upward thrust of the screw 47 on the arm 48 and downward pull on the clip body 42 causes the upper sink engaging loop 40 to draw downwardly through the terminal tip 45 on the sink rim shoulder 35 to effect a tight clamped sealed engagement of the sink rim portion edge provided by the margin 38 against the upper surface of the counter top. At the same time, a stabilizing shoulder 51 of the lower clip loop 41 in the portion thereof that joins the body 42 thrusts against the adjacent portion of the sink bowl wall to prevent inward canting of the clip.

Referring now to the form of FIGURE 5, the counter top is substantially the same as in FIGURE 2 but a sink 52 is shown which in general respects is similar to the sink 34 in that there is an upstanding downwardly and inwardly sloping sink bowl wall joined by an offsetting generally outwardly directed underturned splash guard and upwardly facing shoulder forming and reinforcing offsetting juncture flange 53 to an arched rim flange portion 54. In this instance, the sink rim flange portion 54 has an outer downturned margin 55 providing an edge engageable upon the counter top margin adjacent to the opening 12 within which the sink is disposed, and from the margin 55 the main body portion of the rim flange 54 extends inwardly and downwardly to a more depressed depth than is the case with the rim flange portion 37 of FIGURE 4. In this instance, generally S-shaped resilient spring clips 57 are provided in suitable number for retaining the sink 52 in position relative to the counter top 10 and functioning in general respects similarly as the retaining spring clips 19. Each of the clips 57 includes an upper loop 58, a lower loop 59 and an intermediate connecting body portion 60 from the outer end of which extends upwardly a counter top edge engaging arm 61 providing the outer side of the upper loop 58. At the upper end of the arm 61 the upper hook-like loop 58 has a crown portion 62 extending inwardly and from which projects downwardly and inwardly a resiliently flexible terminal arm 63 provided with a tip 64 engageable thrustingly with the shoulder flange 63 of the sink within the groove defined thereby with the body of the sink rim flange portion 54. Normally, the terminal leg 63 is sprung away from the upstanding arm 61 to at least a slightly greater distance than the spacing between the innermost portion of the shoulder flange 53 and the adjacent edge of the counter top. Thereby, assembly of the clip 57 is adapted to be effected with the sink and counter top substantially the same as described in connection with the clip 19 in FIGURE 3. That is, the clip 57 is moved on its axis upwardly into the gap between the counter top and the sink until the retaining leg 63 snaps inwardly and the retaining tip 64 thereof engages upon the sink shoulder 53.

Retaining, gripping, clamping centering coaction of the retaining clip 57 with the sink and the counter top is effected by movable clip actuating means in the form of a screw 65 acting upon a counter top engaging cramping and clamping lever arm 67. For this purpose, the screw 65 extends freely through a clearance aperture 68 in the arm 67 and an aligned clearance hole 69 in the connecting body 60 of the clip and is threaded into a tapped aligned aperture 70 in the crown portion 62 of the clip. Thus, by running the screw 65 up from a backed off position, a lower end head 71 of the screw compressively acts on the lever arm 67 to swing it upwardly until a biting end terminal 72 thereon engages and clampingly thrusts against the underside of the counter top 10. Thereupon, continued tightening of the screw 65 draws downwardly on the upper clip head loop 58 causing the terminal leg 63 to thrust the tip 64 thereof against the sink shoulder 53 and draw the sink rim flange 54 downwardly to effect a sealing clamped engagement of the edge of the margin 55 thereof against the top of the counter top 10. Inward canting of the clip is prevented by thrusting of a shoulder 73 on the juncture between the arm 67 and the body 60 against the adjacent portion of the sink bowl wall.

When it is desired to remove either of the clips 39 or 57, that can easily be effected by backing off the respective screws to release the lower clamping and cramping lever arms of the clips, and then releasing the upper retaining terminal legs of the clips by means of a screwdriver or the like substantially in the same manner as described in connection with the clips 19.

With respect to each of the clips 19, 39 and 57, turning of the clips while the respective tightening screws are drawn up is effectively prevented by not only backing up of the upstanding upper loop arm against the edge of the counter top, but also by the thrust of the upper loop terminal edge against the sink flange shoulder, then additionally by the biting in of the lower clamping arm terminal into the underside of the counter top, and with respect to the forms of FIGURES 4 and 5, especially, by the backing up of the lower clip loop shoulder against the side of the sink bowl.

In the modification of FIGURE 6, a sink 74 has a lateral rim flange 75 connected by an underturned outwardly projecting reinforcing fold flange 77 to an arched supporting rim flange frame extension 78 having a downturned outer margin 79 for engagement upon the upper side of the counter top adjacent to the opening 12 within which the sink is suspended. The underturned fold flange 77 underlies the rim flange portion 78 in spaced relation and provides an upwardly facing shoulder and an outwardly opening groove. It will be observed that the edge of the fold flange 77 is in relatively close spaced relation to the edge defining the counter top.

For retaining the sink 74 in place with respect to the counter top 10, a suitable series of resilient spring retaining clips 80 is provided each of which includes a generally horizontal body portion 81, in this instance arranged to underlie the counter top 10 in spaced relation and having at its inner end an upwardly projecting arm 82 adapted to oppose the edge of the counter top within the opening 12 and to project up within the gap between the edge of the rim flange 75 of the sink and the counter top edge. On its upper end, the arm 82 has a turned head portion 83 provided with an inwardly and downwardly projecting sink engaging terminal leg 84 having a lower end thrust tip 85 for engaging upon the shoulder provided by the sink rim flange 77.

Means for clampingly actuating the clip 80 comprises a movable member in this instance in the form of a vertical screw 87 threadedly engaging through suitable aperture in the clip body 81 and adapted to be manipulated through a lower end head 88 to drive the upper tip end in thrusting, clamping engagement against the underside of the counter top 10 and thereby draw the clip downwardly so that the upstanding clip arm 82 pulls the head 83 downwardly and thus the terminal leg 84 downwardly to thrust the tip 85 thereof against the sink shoulder 77 and thereby pull the sink frame rim extension 78 downwardly and effect a firm sealing clamped engagement of the edge of the margin 79 against the counter top. In this instance, the clip leg terminal 84 is of a short and relatively stiff form so that it will withstand substantial downward pull and thrust forces with only a minimum of resilient yielding.

Stabilizing means to prevent inward canting of the spring 80 are provided and comprise an underturned inwardly directed portion 89 extending from the outer end of the body 81 and leading into an upwardly and inwardly extending resiliently flexible, tensionable stabilizer arm 90 having a tip 91 which is engageable with the underside of the rim flange 75 inwardly relative to the rim reinforcing and shoulder flange 77. As the screw 87 is drawn up to thereby draw downwardly on the clip arm 82, with a consequent tendency of the clip to cant inwardly about a fulcrum of the thrust tip 85 on the shoulder 77 of the sink, the stabilizer arm 90 engaging at its tip 91 against the underside of the sink rim flange 75 resist such canting and assures substantially straight downward pull of the clip on the sink rim shoulder 77 by the clip.

In FIGURE 7 is shown how the clip 80 is adapted to be assembled with the sink and counter top. In this mode of assembly the clip is tilted or canted inwardly so that the crown 83 opposes the adjacent counter top edge while the stabilizer arm 90 is resiliently compressively deflected toward the arm 82 by pushing the arm 90 up against the underside of the rim flange 75, substantially as shown. Through this maneuver, the engagement leg 84 of the clip can be cleared past the tip of the shoulder flange 77 by moving the same upwardly thereby, and then straightening the clip into the position wherein the arm 82 is generally parallel to the adjacent counter top edge and wherein the tip 85 of the clip overlies the shoulder flange 77 in thrusting relation. Then, as the clip is straightened out, the stabilizer arm 90 snaps open and into endwise opposition to the underside of the sink rim flange 75, while the clip body portion 81 underlies the counter top 10. Finally, tightening of the screw 87 against the underside of the counter top effects clamping sink retaining pull down and thrust function of the clip in association with the sink and the counter top. For removing the clip 80 reverse action or maneuver may be followed.

In FIGURE 8 is disclosed a sink 92 which is similar to the sink 74 but has a rim flange 93 that is inset or depressed substantially deeper than the rim flange 75, providing a substantially deeper overflow curb guard form or a rim flange extension frame flange 94 of arched cross-section having an outer marginal downturned portion 95 with an edge engageable upon the counter top 10 and joined to the rim flange 93 by an outwardly projecting underturned reinforcing fold flange 97 affording an upwardly facing shoulder and defining with the overlying body of the rim flange portion 94 an outwardly opening groove.

In the exemplary form shown in FIGURE 8, the edge of the reinforcing shoulder rim flange 97 presents only a slight clearance gap with the adjacent edge of the counter top 10 defining the opening 12. To accommodate this close spacing, retaining clips 98 of which one is illustrated, each comprise an upwardly projecting elongated arm 99 and a laterally projecting arm 100 in generally L-shaped relationship made from a strip of suitable gauge resilient sheet metal of a thickness slightly less than the gap between the counter top edge and the edge of the shoulder fold flange 97. Thereby, the arm 99 can be inserted through the gap by a longitudinal assembly movement of the arm.

For retaining interengagement of the clip 98 with the sink, the arm 99 which is of substantial width as shown in FIG. 9, has struck therefrom a retaining terminal flange tab 101 connected integrally on a juncture 102 with a head end portion 103 of the leg 99. Normally the terminal flange tab 101 projects divergently from the face of the arm 99 opposite to that from which the lower arm 100 projects so that a lower free thrust terminal end 104 on the tab is adapted to oppose thrustingly the flange shoulder 97 of the sink. In the course of assembling the arm 99 into the space between the sink flange and the edge of the counter top, the face of the arm 99 opposite to that from which the shoulder terminal tab 101 projects is slidably started up along the edge of the counter top with the flat head end portion 103 of the arm piloting the arm into the receiving space. The in the continued assembly movement of the clip, the tab 101 is resiliently flexed toward and into the strike-out aperture of the arm 99 as the tab cams along the edge of the sink shoulder fold flange 97, until the retaining tip 104 clears the sink flange, whereupon the tab 101 springs out into the retaining relation to the sink flange.

Thereafter, a movable clamping member conveniently in the form of a screw 105 threaded through a tapped hole 107 in the lower clip arm 100 is driven by means of a suitable tool such as a screwdriver applied to a lower end head 108 on the screw from a backed off position into engagement at its upper end tip against the underside of the counter top against which the screw is tightened. In tightening, clamping engagement of the screw with the counter top 10, the retaining terminal flange tab 101 is thrust by downward drawing of the arm 99 toward the rim shoulder flange 97 so that the retaining tab tip 104 imposes downward thrust pressure to pull the outer marginal edge of the sink flange frame portion 94 snugly against the counter top. Any tendency for the clip to cant inwardly under the screw thrust is firmly resisted not only by the backed up relationship of the clip arm 99 against the edge of the counter top, but also by the more or less biting edge provided by the thrust tip 104 of the terminal flange tab 101. Should the arm 99 nevertheless tend to cant inwardly, the lower end portion of the arm 99 will engage the closely adjacent edge of the rim flange 97 and be positively held against further canting.

Although several modifications have been disclosed, illustrative of the substantial versatility of the instant invention and adaptability to various sink marginal rim flange configurations and construction, other modifications are possible utilizing various features of the several modifications by substitution and combination.

It will be understood that modifications and variations may be effected without departing from the scope of the novel concepts of the present invention.

I claim as my invention:

1. In a sink structure including a counter top and a sink having a lateral rim flange with a portion thereof seating on the counter top and a generally upwardly facing shoulder under said portion in spaced adjacency to an edge of the counter top, and a resilient spring retaining clip having an upwardly projecting arm with a downwardly and inwardly extending terminal end projection thrustingly engageable with said shoulder, said arm opposing the adjacent edge of the counter top to prevent outward displacement of said projection from said shoulder, means on the clip for clampingly engaging the underside of the counter top, and means on the lower portion of the clip projecting inwardly below said terminal end for engaging in stabilizing relation against the sink to hold the clip against canting inwardly during said clamping engagement with the underside of the counter top.

2. In a sink structure including a sink having a bowl with an upstanding wall provided with a counter top engaging lateral upper portion having an out-turned flange portion of the sink projecting outwardly a limited distance thereunder and providing an upwardly facing shoulder, and a resilient spring clip having a head portion provided with a resiliently flexible snap-in retaining terminal engageable with the sink shoulder and a lower portion on the clip having means for clamping engagement with the counter top and acting to cant the clip away from the counter top and toward the sink, said clip having a generally inwardly projecting portion resiliently engageable in stabilizing relation against the sink to retain the clip against canting inwardly relative to the counter top and sink.

3. In a sink structure including a counter top having an opening therein and a sink comprising a bowl projecting through said opening and having a lateral rim flange with a portion thereof seated upon the counter top and an underturned upwardly facing shoulder under said portion adjacent to the edge of the counter top, a resilient spring clip having an upwardly extending hook portion provided with an inwardly and downwardly extending terminal engaging said shoulder and a lower loop portion having a screw therethrough and threaded into another portion of the clip and acting on said loop portion to press a portion thereof into clamping engagement with the underside of the counter top and another portion into stabilizing shouldering relation to a portion on the sink bowl.

4. In a sink structure including a counter top having an opening therein and a sink bowl in said opening and having a lateral rim flange with a portion thereof overlying and seating on the counter top, with an underturned reinforcing and shoulder flange portion joining said portion to the remainder of the sink bowl, said underturned shoulder flange portion being disposed in adjacent spaced relation to the edge of the counter top defining said opening, and a generally S-shaped retaining clip having an upper hook-like loop portion with a resilient snap-in terminal flange portion having an edge extending downwardly and engaging against said shoulder and a lower hook-like loop having a clamping and cramping arm with an end portion engaging clampingly against the underside of the counter top and a stabilizing shoulder portion engaging against the sink adjacent to the underside of said shoulder flange, and a movable member secured to one portion of the clip and applying cramping and clamping pressure to said arm and pulling downwardly on said shoulder-engaging terminal of the clip.

5. In a sink structure including a counter top having an opening therein and a sink bowl in said opening and having a lateral rim flange with a portion thereof overlying and seating on the counter top, with an underturned reinforcing and shoulder flange portion joining said portion to the remainder of the sink bowl, said underturned shoulder flange portion being disposed in adjacent spaced relation to the edge of the counter top defining said opening, a generally S-shaped retaining clip having an upper hook-like loop portion with a resilient snap-in terminal flange portion having an edge extending downwardly and engaging against said shoulder and a lower hook-like loop having a clamping and cramping arm with an end portion engaging clampingly against the underside of the counter top and a stabilizing shoulder portion engaging against the sink adjacent to the underside of said shoulder flange, and a movable member secured to one portion of the clip and applying cramping and clamping pressure to said arm and pulling downwardly on said shoulder-engaging terminal of the clip, said upper clip loop having an upstanding substantially straight arm thrustingly engaging against the edge of the counter top.

References Cited in the file of this patent

UNITED STATES PATENTS

| | | |
|---|---|---|
| 610,967 | Hill | Sept. 30, 1898 |
| 1,049,476 | Hathaway | Jan. 7, 1913 |
| 2,319,058 | Hansman | May 11, 1943 |
| 2,582,816 | Bonnell | Jan. 15, 1952 |
| 2,765,397 | Harris | Oct. 2, 1956 |
| 2,790,181 | McCarthy | Apr. 30, 1957 |
| 2,840,829 | Hammer | July 1, 1958 |
| 2,843,855 | Hammer | July 22, 1958 |
| 2,877,468 | Lawson | Mar. 17, 1959 |
| 2,883,677 | Geen | Apr. 28, 1959 |